(12) United States Patent
Klein et al.

(10) Patent No.: US 10,452,123 B2
(45) Date of Patent: Oct. 22, 2019

(54) PREDICTIVE POWER SAVING AND SCREEN DIMMING FOR COMPUTING DEVICES

(71) Applicant: GOOGLE INC., Mountain View, CA (US)

(72) Inventors: Daniel Klein, Pittsburg, PA (US); Jeffrey Hoy, Gibsonia, PA (US)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 15/474,484

(22) Filed: Mar. 30, 2017

(65) Prior Publication Data

US 2018/0284877 A1    Oct. 4, 2018

(51) Int. Cl.
| | | |
|---|---|---|
| *G06F 1/00* | (2006.01) | |
| *G06F 1/3287* | (2019.01) | |
| *G06F 1/3212* | (2019.01) | |
| *G06F 1/3231* | (2019.01) | |
| *G06F 1/3296* | (2019.01) | |
| *G06N 5/04* | (2006.01) | |
| *G06F 1/3209* | (2019.01) | |

(52) U.S. Cl.
CPC .......... *G06F 1/3287* (2013.01); *G06F 1/3212* (2013.01); *G06F 1/3231* (2013.01); *G06F 1/3296* (2013.01); *G06N 5/04* (2013.01); *G06F 1/3209* (2013.01); *Y02D 10/174* (2018.01)

(58) Field of Classification Search
None
See application file for complete search history.

(56) References Cited

U.S. PATENT DOCUMENTS

| | | | |
|---|---|---|---|
| 5,996,078 A | 11/1999 | Christensen et al. | |
| 6,594,767 B1 | 7/2003 | Wiley et al. | |
| 7,069,462 B2 | 6/2006 | Owen et al. | |
| 8,190,216 B2 | 5/2012 | King | |
| 8,612,782 B2 * | 12/2013 | Vilhauer ............... | G06F 1/3212 713/300 |

(Continued)

FOREIGN PATENT DOCUMENTS

WO    2016196001 A1    12/2016

OTHER PUBLICATIONS

International Search Report and Written Opinion for Application No. PCT/US2017/059337, dated Feb. 16, 2018, 17 pages.

(Continued)

*Primary Examiner* — Nitin C Patel
(74) *Attorney, Agent, or Firm* — Brake Hughes Bellermann LLP

(57) ABSTRACT

A method includes receiving an instruction to transition a device into a reduced power state, predicting an availability of a power source determining a charge of a power storage element, determining whether the power source is predicted to be available before the charge of the power storage element falls below a threshold value, upon determining that the power source is predicted to be available before the charge of the power storage element falls below the threshold value, preventing the transition of the device into the reduced power state, and upon determining that the power source is not predicted to be available before the charge of the power storage element falls below the threshold value, transitioning the device into the reduced power state.

20 Claims, 8 Drawing Sheets

(56) References Cited

U.S. PATENT DOCUMENTS

| | | | |
|---|---|---|---|
| 8,793,520 B2 | 7/2014 | Ingrassia, Jr. et al. | |
| 2009/0163226 A1 | 6/2009 | Karkaria et al. | |
| 2009/0313484 A1* | 12/2009 | Millet | G06F 1/3203 713/300 |
| 2010/0082175 A1 | 4/2010 | Gartner | |
| 2011/0268425 A1* | 11/2011 | Glen | H04N 5/63 386/272 |
| 2012/0210325 A1* | 8/2012 | de Lind van Wijngaarden | H04W 52/0258 718/103 |
| 2013/0103960 A1 | 4/2013 | Alberth et al. | |
| 2014/0195843 A1 | 7/2014 | Lai et al. | |
| 2015/0084778 A1 | 3/2015 | Mittal et al. | |
| 2015/0293575 A1 | 10/2015 | Hampson et al. | |
| 2016/0018870 A1 | 1/2016 | Arora et al. | |

OTHER PUBLICATIONS

Ravi, et al., "Context-Aware Battery Management for Mobile Phones", Ravi et al.; "Context-Battery Management for Mobile Phones", Pervasive Computing and Communications, Sixth Annual IEEE International Conference; Mar. 17, 2008; XP031250384; pp. 224-233.

\* cited by examiner

PREDICTIVE POWER SAVING AND SCREEN DIMMING FOR COMPUTING DEVICES

FIELD

Embodiments relate to power management in a computing device.

BACKGROUND

Computing devices, such as desktop computers, laptop computers, tablet computers, netbook computers, or other such devices, often implement a number of power management techniques in order to reduce the amount of power consumed by those devices, so as to prolong battery life between charges and/or to reduce the total amount of power consumed by a given device. In some approaches, such techniques may be used only when the device is operating on battery power, or, in other approaches, may be used regardless of the power source being used (e.g., battery or AC power). Common power management techniques include performing a screen dimming operation for a display panel of a computing device, turning off the display and/or performing a system suspend or hibernation operation, where current operating state information for a computing device is saved, respectively, to random access memory (RAM) or to disk (e.g., a hard drive, or a solid-state/flash drive), and the computing device is then placed in a very low power operating state.

Such power management techniques may be performed by a computing device when the computing device detects that the computing device has not received any user input (e.g., keyboard or pointing device input) in a specific period of time and power management activities are enabled on the computing device (e.g., an application running on the system (or other component of the system) has not disabled power management activities). For example, a computing device may first dim a computing device's screen after a period of time, and then, sometime later, turn off the screen, and then, sometime even later, perform a system suspend operation or hibernation operation, such as those described above, and remain in the suspend state or hibernation state until the user deliberately interacts with the computing device to indicate the user wishes to use the device by, for example, opening a display panel lid, entering a keystroke, using the pointing device or engaging a power switch. Such approaches, however, can detract from a user's experience. For example, should the display dim while the user is reading the content displayed on the display the user may have to take action (e.g., tap a key) to bring the computer back to full brightness and/or should the computing device transition into a hibernation state, the user must wait for the computing device to resume from hibernation or suspend before the system is ready for use.

SUMMARY

In a general aspect, a method (and non-transitory computer readable medium implementation thereof) includes receiving an instruction to transition a computing device into a reduced power state, predicting an availability of a power source to provide power to the computing device, determining a charge of a power storage element (e.g., battery, capacitor, fuel cell, supercapacitor cells and/or the like) of the computing device, determining whether the power source is predicted to be available before the charge of the power storage element falls below a threshold value, upon determining that the power source is predicted to be available before the charge of the power storage element falls below the threshold value, preventing the transition of the computing device into the reduced power state, and upon determining that the power source is not predicted to be available before the charge of the power storage element falls below the threshold value, transitioning the computing device into the reduced power state.

In another general aspect, a method (and non-transitory computer readable medium implementation thereof) includes receiving a current power storage element status, a power storage element discharge rate and at least one scheduled event associated with a user of a computing device, predicting an availability of a power source to provide power to the computing device, determining a charge of a power storage element of the computing device, the availability of the power source being determined based on the at least one scheduled event associated with the user and the charge of the power storage element being determined based on the current power storage element status and based on the power storage element discharge rate, determining whether the power source is predicted to be available before the charge of the power storage element falls below a threshold value, upon determining that the power source is predicted to be available before the charge of the power storage element falls below the threshold value, generating a modified reduced power state based on a full active state, wherein the full active state indicates the computing device is operating without any power restrictive settings, and communicating the modified reduced power state to the computing device.

Implementations can include one or more of the following features. For example, predicting a future charge of the power storage element can be based on a current power storage element status, a power storage element discharge rate while the computing device is in a normal power state and a predicted time that the computing device will have access to the power source. The availability of the power source can be predicted based on at least one of a calendar event associated with a user of the computing device and location data associated with the calendar event, a current location of the computing device, a behavior of the user and location data associated with the behavior, and a charging history associated with the location data.

For example, the predicting of the future availability of the power source can include determining, based on variables used to determine a next charge opportunity and an amount of power that will be consumed by the computing device, a risk factor, the risk factor indicating how likely the next charge opportunity is to be reached before a determined amount of power will be consumed by the computing device, determining a confidence interval indicating how likely the next charge opportunity and the amount of power that will be consumed by the computing device are accurate, and using the confidence interval and the risk factor to determine the future availability of the power source.

The method can further include communicating a current power storage element status, a power storage element discharge rate, and at least one scheduled event associated with a user of the computing device to a server communicatively coupled to the computing device, receiving a power save configuration in response to communicating the current power storage element status, the power storage element discharge rate, and the at least one scheduled event to the server, the power save configuration being based on the charge of the storage element and the future availability of the power source, using the power save configuration to modify the reduced power state and using the modified reduced power state to prevent the transition of the computing device into the reduced power state.

Transitioning the computing device into the reduced power state can include communicating at least one signal to one or more elements of the computing device. The determine of a next charge opportunity and an amount of power that will be consumed by the computing device, a risk factor, the risk factor indicating how likely the next charge opportunity is to be reached before a determined amount of power will be consumed by the computing device, determining a confidence interval indicating how likely the next charge opportunity and the amount of power that will be consumed by the computing device are accurate, and using the confidence interval and the risk factor to determine the future or next charge opportunity.

The determined availability of the power source can be determined based on at least one of a calendar event and location data associated with the calendar event, a user behavior and location data associated with the user behavior, and a charging history associated with the location data. The method can further include receiving a user history associated with the user of the computing device, the user history indicating power use associated with at least one of during an event, and over a duration of the event, wherein the prediction of the future or next charge opportunity is further based on the user history.

The method can further include receiving an aggregate user history associated with the user of the computing device, wherein the aggregate user history includes historical data associated with a plurality of users having a historical power use at least one of during an event and over a duration of the event similar to the at least one scheduled event, and the prediction of the future or next charge opportunity is further based on the aggregate user history. The method can further include receiving a user history associated with a location, wherein the user history indicates whether or not the user of the device has previously charged the device at the location, the availability of the power source is predicted based on a calendar event and location data associated with the calendar event, the location data indicating the computing device will be at the location.

The predicting of the future or next charge opportunity can include determining a probability that the computing device will have access to the power source before the charge of the power storage element falls below a threshold value is determined based on the current power storage element status, the power storage element discharge rate and the at least one scheduled event associated with a user of the computing device, and the modified reduced power state is generated based on the determined probability and a threshold value.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
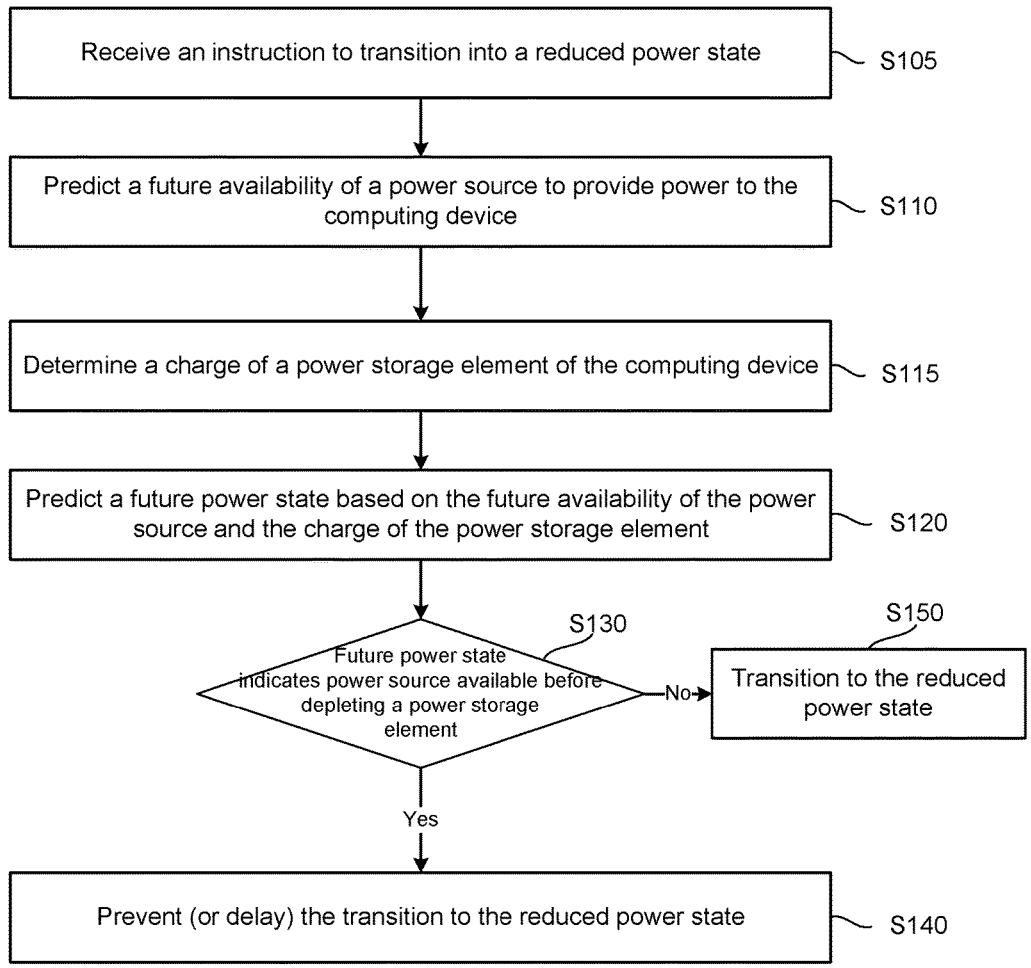
FIGS. 1-4 are flowcharts illustrating methods in accordance with at least one example embodiment.

It should be noted that these Figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

Example embodiments can predict user behavior to affect power management. Accordingly, a next point in time that a power storage element or electrical energy storage element (e.g., battery, capacitor, fuel cell, supercapacitor cells and/or the like), herein after power storage element of a device (e.g., desktop, server, laptop, tablet or mobile phone) will be charged can be predicted and/or determined. Further, a duration and/or amount of charge (e.g., battery status) and confidence interval can be determined. Then, one or more power management settings can be altered or modified based on the current power storage element capacity and an anticipated future charging prediction. In addition (and/or alternatively), the power management settings can be altered based on a determined confidence interval (e.g., a time interval between entry into a power save state and a next charge opportunity), risk of power loss and currently available power storage element charge. The power management settings can be altered or modified to improve (as opposed to automatically entering a power save state) user experience.

FIGS. 1-4 are flowcharts of methods according to example embodiments. The steps described with regard to FIGS. 1-4 may be performed due to the execution of software code stored in a memory and/or a non-transitory computer readable medium (e.g., memory 630, 710) associated with an apparatus (e.g., as shown in FIGS. 5, 6, 7 and 8 (described below)) and executed by at least one processor (e.g., processor 605, 705) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1-4.

FIG. 1 is a flowchart illustrating a method of preventing a transition to a reduced power state in accordance with at least one example embodiment. As shown in FIG. 1, in step S105 an instruction to transition to a reduced power state is received. For example, a power manager (e.g., power manager 625 discussed below) may be configured to manage the process of transitioning a computing device (e.g., computing device 505) from one power state to another. The power manager may read or receive information (e.g., from at least one sensor) indicating a lack of use and, based on this information, select a power state (e.g., Standby, Sleep, or Suspend as described below) for the computing device and initiate a transition of the computing device to the selected power state.

In step S110 a future availability of a power source to provide power to the computing device is predicted. For example, the prediction can be based on the device metadata and/or variables (or variable data) stored as metadata. In an example implementation, the prediction can be based on a calendar event and location data associated with the calendar event. In another example implementation, the prediction can be based on a user behavior and location data associated with the user behavior. The calendar event and/or the user behavior can be used to predict whether or not a power source will be available to the user at some time in the future.

In step S115 a charge of a power storage element of the computing device is determined. For example, device metadata and/or variables (or variable data) stored as metadata can include a percent charge of the power storage element (e.g., battery).

In step S120 a future power state is predicted. For example, the future power state can be a state in which the computing device is coupled to a power source to provide power to the computing device and/or charge a power storage element of the computing device. Alternately (or in addition to), the future power state can include a status of the power storage element of the computing device. In this example, the power storage element status may indicate the power storage element is sufficiently charged (e.g., greater than 10%) should the computer device continue to operate without transitioning to the reduced power state when the power source becomes available to provide power to the computing device.

In step S130, whether the future power state indicates a power source is available before depleting power storage element is determined. For example, a probability that the computing device will be at the power source before depleting the power storage element can be determined based on the current power storage element status (e.g., percent charged), a power storage element discharge rate while the computing device is in a normal power state and a predicted time that the computing device will likely have access to the power source. The predicted time can be a time of day (e.g., 3 PM) or a duration (e.g., 3 hours). The predicted time that the computing device will likely have access to the power source can be based on predicted user (e.g., of the computing device) actions. The predicted user actions can be based on historical data about the user, an expected geo-location of the user, information about a geo-location, aggregate data associated with like users, aggregate data associated with the geo-location and the like.

Upon determining the future power state indicates a power source will be available before depleting power storage element (yes in step S130), in step S140 the transition to the reduced power state is prevented (or delayed) based on the predicted future power state. For example, the power manager can be configured to signal one or more elements of the computing device to initiate or cause a desired change in power state (e.g., turn off a display). In this example implementation, the signals can be blocked (or delayed for a period of time) from being sent. The steps described with regard to FIG. 1 can be implemented by the power manager. Accordingly, the power manager can be further configured to block, interrupt or delay the signal to one or more elements of the computing device based on the predicted future state. For example, should the power manager be implemented using processor instructions (e.g., software code), the instruction to signal the one or more elements of the computing device can be skipped or replaced (e.g., with a no operation or no-op) based on the predicted future state.

In an example implementation, an inactivity period that can cause a transition to a reduced power state can be directly proportional to a current power storage element charge, a proximity of departure time from a location (e.g., the current location) with a charging history to an area without a charging history and inversely proportional to a historical probability of a future charging event in the current location or a planned (e.g., based on a calendar event) location (e.g., the higher the probability, the longer the we determined inactivity period).

In another (or additional) example implementation, the user's tolerance for a low charge may affect the algorithm. For example, if the user is medical personnel using the device as a primary pager, fully running out of power may be unacceptable. By contrast, users of a home laptop may have high tolerance for a low power storage element, because the user may have a charger or other alternate power source nearby. This tolerance threshold would be incorporated into the algorithm as the lowest confidence threshold allowed, before reaching the next charge. The threshold value could be either set by the user, or perhaps learned (e.g., using machine learning techniques) in response to how the user reacts to a low power storage element.

Further, the position of power sources (e.g., kiosks) nearby may be detectable (e.g., a kiosk that broadcasts its location) or available from an online map that can be correlated with geolocation. Accordingly, the algorithm can take this position into account, either for higher probability of a charge, or for alerting the user to take advantage of an available power source. For example the user can be alerted that a wireless charging station is close by and the user could move within range of the wireless charger while the user performs some other task (e.g. wait for an event, makes a phone call or the like).

Still further, if different types of charging come at different costs (e.g., in dollars, euros, and the like) or in time (e.g., how quickly the charging method can charge the device). For example, if wireless charging costs twice as much (or is slower) as wired charging, the device prediction may be configured to minimize the overall charge costs to the user. The device would use a more expensive, earlier-available charge method if needed to make it to the next charge (e.g., as allowed within a confidence interval).

Upon determining the future power state indicates a power source will not available before depleting power storage element (no in step S130), in step S150 the computing device is transitioned to the reduced power state. For example, the power manager can signal the one or more elements of the computing device to cause the desired change in power state.

In an example implementation, if the device missed a prediction (e.g., incorrectly predicted the future power state), and did not get charged by the user as expected, the computing device can alert the user. This would be different than a normal low power alert, in that an unusual situation has occurred (user may have a charger handy, or user may want to take extra steps to get the device charged up). Alternatively (or in addition), the computing device can transition to the reduced power state.

Figure 2:
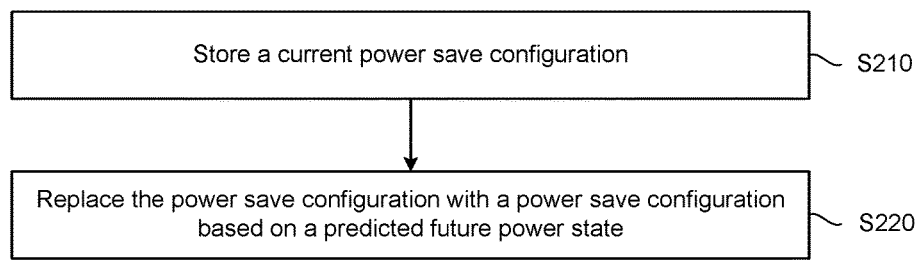

In another example implementation, if the future power state indicates a power source will be available before depleting the power storage element (e.g., yes in step S130), power management settings can be altered. FIG. 2 is a flowchart illustrating a method of altering power management settings in accordance with at least one example embodiment. As shown in FIG. 2, in step S210 a current power save configuration is stored. For example, a computing device can include a plurality of power management settings corresponding to a power save configuration. The plurality of power management settings can include a power impact setting (e.g., brightness) associated with at least one element (e.g., a display) of the computing device. A particular set of power management settings can be called a power state. These power states are described below as, for example, active power state, suspend-to-RAM power state, display-off active state, reduce CPU power consumption, suspend-to-disk power state, and the like. Data or settings (e.g., a display brightness) corresponding to one or more of these states may be saved or stored in a memory (e.g., memory 630) as the current power save configuration.

In step S220 the power save configuration is replaced with a power save configuration based on a predicted future power state. For example, at least one of the power states can be altered. As an example implementation, the display-off active state can include turning off the display or setting a brightness of the display to off (e.g., 0%) while leaving some portion of the other power consuming elements of the computing device active. In an altered display-off active state, instead of setting the display to off or a brightness to off, the brightness can be left as is (e.g., as in the active state) or set to a default value (e.g., 50%, 80%, and the like). In other words, one or more settings in the display-off active state can be changed resulting in an altered display-off active state. The altered display-off active state can then replace the display-off active state in the power save configuration.

Figure 3:
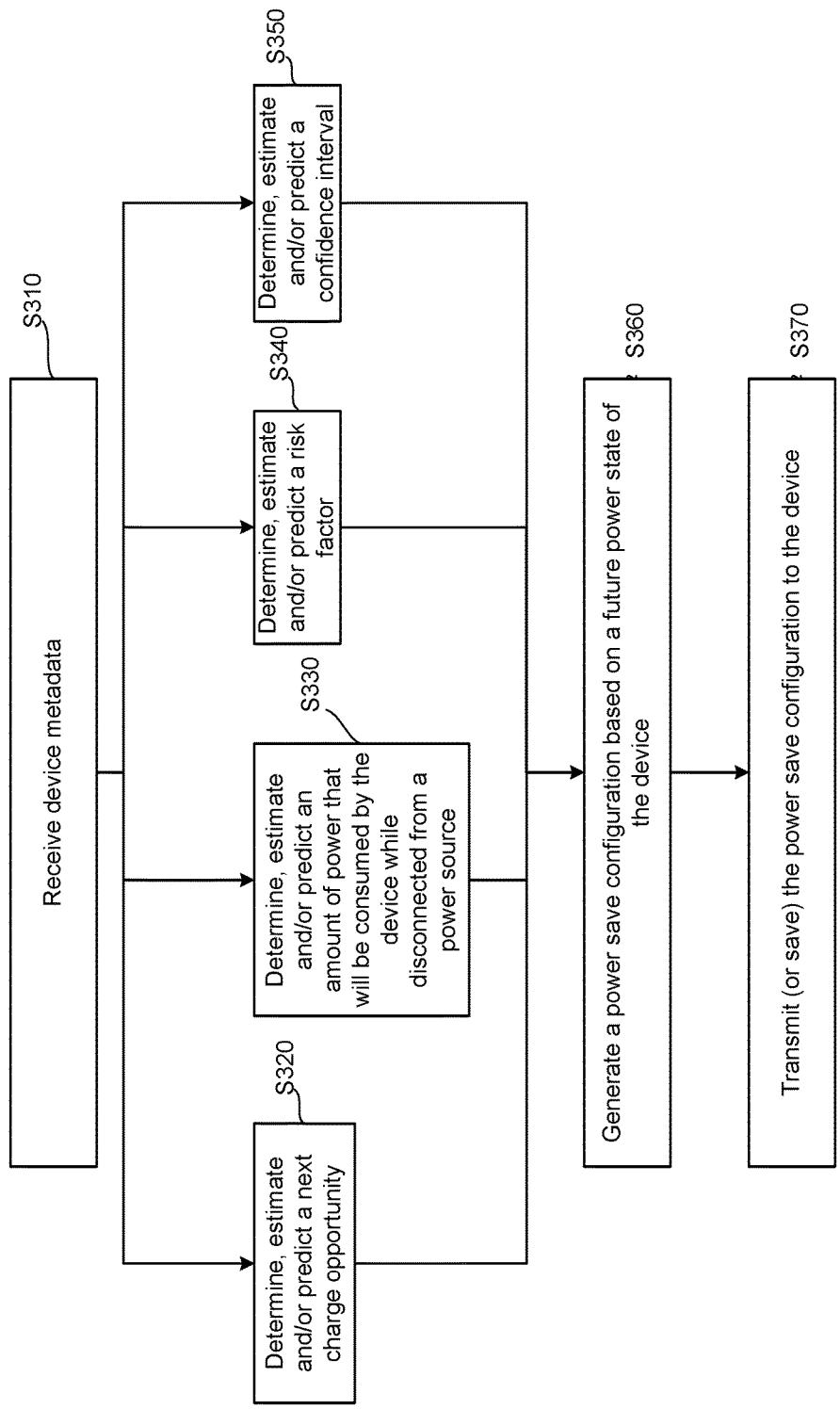

FIG. 3 is a flowchart illustrating another method of altering power management settings in accordance with at least one example embodiment. As shown in FIG. 3, in step S310 device metadata is received. For example, a computing device (e.g., computing device 505 and/or laptop 510) can communicate device metadata to a server (e.g., server 515) as a backend or shared computing system. Alternatively (or in addition to), the server (e.g., server 515) can receive the device metadata from a data storage device (e.g., datastore 520). Alternatively (or in addition to), the computing device (e.g., computing device 505 and/or laptop 510) can receive the device metadata from a data storage device (e.g., datastore 520). The computing device can also include a portion of the device metadata which can be combined with the received device metadata.

The device metadata can include information related to power, power state of the device, power configuration of the device, power status of the device, power consumption of the device, a number of applications running on the device and/or a quality (e.g., business application having a high quality whereas a game can be low quality) of applications running on the device. The device metadata can include information about the user of the device. The device metadata can include the normal operating power state of the device, a power save state (e.g., reduce CPU power consumption, display-off active or suspend-to-RAM described below) and/or other power save configurations for the device. The information about the user of the device can include historical and/or habitual data about the user's use of the device, the user's activities, the user's schedule and the like. The information about the user of the device can include scheduled events (e.g., from a calendar, to-do list, and the like) associated with the user of the device. The device metadata can include aggregate data about a plurality of users that are similar to the user of the device. For example, the aggregate data can be associated with power use during events and/or over a duration (or portion thereof) of an event by users other than the user of the device. In other words, the aggregate data can be aggregate user history that can include historical data associated with a plurality of users having a historical power use at least one of during an event and over a duration of the event similar to the at least one scheduled event. The other users can be other users at a same event or a like event (e.g., a different activity at a same location. The device metadata can include location data related to a current position of the device and/or an expected (e.g., future) position of the device. The historical power use can be power consumption associated with use of the device (e.g., using the device as a camera to record the event) and/or power charging availability (e.g., do users typically charge the device during the event). In an example implementation, the server can receive (in a first communication) a percent charge from the device itself (e.g., from computing device 505 and/or laptop 510). The server can also receive (in a second communication) a calendar including at least one scheduled event and habitual data associated with the user of the device from the data storage device (e.g., datastore 520).

In step S320 a next charge opportunity is determined, estimated and/or predicted. For example, a next charge opportunity can be predicted based on when the device will have access to a power source or a power source will be available. The prediction can be based on the device metadata and/or variables (or variable data) stored as metadata. In an example implementation, the prediction can be based on a calendar event and location data associated with the calendar event. In another example implementation, the prediction can be based on a user behavior and location data associated with the user behavior. For example, a calendar event can indicate dining at a restaurant (or in a meeting and the like) or the user behavior can indicate that the user will likely be dining at the restaurant (or in a regularly attended meeting and the like). The location data associated with the restaurant (or meeting room) can indicate the user will have access to a power source at the restaurant (or meeting room). In an example implementation, the prediction can be based on a user behavior, calendars, appointments and/or travel. For example, the user could be in a vehicle with a charger after work (e.g., after 5 PM) every weekday. In an example implementation, the prediction can be based on the current location (with access to a power source). For example, the user behavior can indicate that the user will likely remain in the current location with power disconnected. Therefore, the user can likely connect to the power source before the power storage element is depleted or below a threshold.

In addition, having access to a power source or determining a power source will be available can take into consider whether or not enough power will be available. For example, if the device is at 50% charge and the user will be at a geolocation (e.g., an airport), where chargers are available. However, if the user will not be at the geolocation for a long enough time to use the charger (e.g., the user is running late, and will only have 5 m to catch a flight after clearing security), the prediction in this case may indicate transitioning to a power saving is needed eventhough a power source is available at the geolocation.

In step S330 an amount of power that will be consumed by the device while disconnected from a power source is determined, estimated and/or predicted. For example, the server (or device) can determine, estimate and/or predict an amount of power that will be consumed by the device while disconnected from a power source. The amount of power that will be consumed by the device can be based on a predicted activity while the device is not connected to a power source. The prediction can be based on the device metadata and/or variables (or variable data) stored as metadata. For example, if the user is attending a meeting (e.g., based on a calendar event), and/or historical data associated with the device includes data associated with power use during a meeting, the amount of power that will be consumed by the device can be determine based on the historical data. For example, if the user is watching a movie (local device metadata) and it is 30 m long (local and server metadata), that implies the user will be watching for 30 m at a (locally device metadata) power consumption rate. Accordingly, the amount of power that will be consumed by the device can be determined based on device local metadata and server metadata. In another implementation, the amount of power that will be consumed by the device can be estimated based on current consumption. In other words, power may be estimated to continue to be consumed at approximately the same rate that the power is currently being consumed at.

In step S340 a risk factor is determined, estimated and/or predicted. For example, the risk factor can be based on the variables used to determine the next charge opportunity, the amount of power that will be consumed by the device until the next charge opportunity and/or an estimated amount of charge added during the next charge opportunity. The risk factor can indicate how likely the prediction of the next charge opportunity is to be reached before the predicted amount of power will be consumed by the device. In other words, how likely it is that the device is connected to the power source before the device runs out of (or is critically low on) stored power. The risk factor could be based on a predicted power storage element level (e.g., percentage remaining or time remaining) when the device should be connected to the power source. For example, if based on power storage element percentage, a low percent remaining (e.g., 10%) could have a high risk factor and a high percentage remaining (e.g., 80%) could have a low risk factor.

In step S350 a confidence interval is determined, estimated and/or predicted. The confidence interval can indicate how likely the next charge opportunity and the amount of power that will be consumed by the device are accurate. In other words, the confidence interval indicates whether or not or the degree to which the next charge opportunity and the amount of power that will be consumed by the device can be used to estimate a future power state. Accordingly, the server can determine a confidence interval based on the next charge opportunity and the amount of power that will be consumed by the device. In an example implementation, the next charge opportunity and the amount of power that will be consumed by the device can include variable values and/or look-up values that indicate the accuracy of associated estimations and/or predictions. The variable values and/or look-up values can vary based on the accuracy. For example, if every weekday at 5 pm a user of the device is in his/her vehicle driving home (in an automobile with a history of charging the device) from work, a variable value for a next charge opportunity associated the user behavior can be high as compared to a user that leaves work at random times. The confidence interval can be a sum, product and/or the like of the variable values. The variable values can be weighted. For example, the next charge opportunity could be weighted more or less heavily than the amount of power that will be consumed by the device.

In step S360 a power save configuration is generated based on a future power state of the device. In an example implementation, the future power state of the device is based an active state or a variation thereof. For example, if the confidence interval is high (e.g., a high confidence that the next charge opportunity and amount of power consumption are accurate) and the risk factor (e.g., risk of a low power storage element state) is low, the future power state of the device can be a full active state (e.g., no power usage restrictions on the device).

The confidence interval and the risk factor can have threshold value combinations used to determine the future power state. For example, high could have a threshold value of 80, mid could have a threshold value of 50, and low could have a threshold value of 20 (based on a maximum of 100 scale). Table 1 is a look-up table indicating possible combinations and a resultant power state. A full active state can be the computing device is powered on without any power restrictive settings. For example, display is on, communication interfaces (e.g., WIFI) on, and the like. A reduced active low state can be similar to the full active state with the exception that some restrictive power settings are implemented. For example, the display is on with 30% brightness. A reduced active mid state can be between the full active state and the reduced active low state. For example, the display is on with 70% brightness. The reduced active mid state and the reduced active low state can be power states that conserve power while enabling continued use of the device as opposed to a typical power save state (e.g., reduce CPU power consumption, display-off active or suspend-to-RAM described below).

TABLE 1

| Confidence Interval | Risk Factor | Power State |
|---|---|---|
| High | High | Reduced Active Mid |
| Med | High | Reduced Active Low |
| Low | High | Reduced Active Low |
| High | Med | Full Active |
| Med | Med | Reduced Active Mid |
| Low | Med | Reduced Active Low |
| High | Low | Full Active |
| Med | Low | Full Active |
| Low | Low | Reduced Active Mid |

The power save configuration is generated to implement the resultant power state. For example, the full active state can be the normal operating state of the device. In an example implementation, the full active state can be a power state included in the received device metadata. Therefore, the generated power save configuration can include reading a power or power save configuration from the received device metadata. As mentioned above, the reduced active mid state and/or reduced active low state can be based on the full active state. Accordingly, in an example implementation, the generated power save configuration can include reading a power or power save configuration from the received device metadata and then modifying the configuration to implement a conservation of power without disabling use of the device (e.g., dimming without turning off a display).

In step S370 the power save configuration is transmitted to the device. For example, the server can communicate the power save configuration to the device via a wired or wireless communication network. In an alternate embodiment, the device generates the power save configuration using the aforementioned technique. Accordingly, there may be no communication of the power save configuration.

Figure 4:
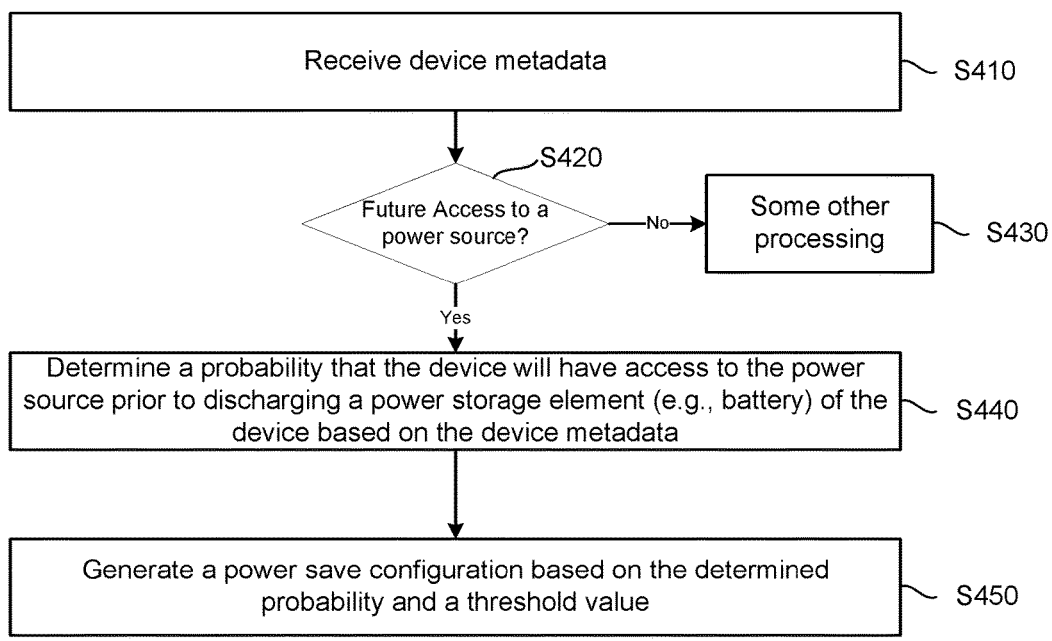

FIG. 4 is a flowchart illustrating a method of altering generating power management settings in accordance with at least one example embodiment. As shown in FIG. 4, in step S410 device metadata is received. For example, a computing device (e.g., computing device 505 and/or laptop 510) can communicate device metadata to a server (e.g., server 515) as a backend or shared computing system. Alternatively (or in addition to), the server (e.g., server 515) can receive the device metadata from a data storage device (e.g., datastore 520).

The device metadata can include information related to power, power state, power configuration or power status of the device. The device metadata can include information about the user of the device. The device metadata can include the normal operating power state of the device, a power save state (e.g., reduce CPU power consumption, display-off active or suspend-to-RAM described below) and/or other power save configurations for the device. The information about the user of the device can include historical and/or habitual data about the user's use of the device, the user's activities, the user's schedule and the like. The information about the user of the device can include scheduled events associated with the user of the device. The device metadata can include aggregate data about a plurality of users that are similar to the user of the device. For example, the aggregate data can be associated with power use during events and/or over a duration (or portion thereof) of an event by users other than the user of the device. In other words, the aggregate data can be aggregate user history that can include historical data associated with a plurality of users having a historical power use at least one of during an event and over a duration of the event similar to the at least one scheduled event. The device metadata can include location data related to a current position of the device and/or an expected (e.g., future) position of the device. In an example implementation, the server can receive (e.g., in a first communication) a percent charge from the device itself (e.g., from computing device 505 and/or laptop 510). The server can also receive (e.g., in the first communication and/or in a second communication) a calendar and habitual data associated with the user of the device from the data storage device (e.g., datastore 520).

In step S420 determine whether there will be future access to a power source. The prediction can be based on the device metadata and/or variables (or variable data) stored as metadata. In an example implementation, future access can be based on a calendar event and location data associated with the calendar event. In another example implementation, future access can be based on a user behavior and location data associated with the user behavior. For example, a calendar event can indicate dining at a restaurant (or in a meeting and the like) or the user behavior can indicate that the user will likely be dining at the restaurant (or in a regularly attended meeting and the like). The location data associated with the restaurant (or meeting room) can indicate the user will have access to a power source at the restaurant (or not have access to a power source in the meeting room). In an example implementation, future access can be based on a user behavior. For example, the user could be in a vehicle after work (e.g., after 5 PM) every weekday. If there will not be future access to a power source, or not be future access within a threshold amount of time (e.g., 8 hours) and/or future access can not be determined, processing continues to step S430. In step S430, some other processing will be performed (e.g., a normal power save operation). Otherwise, processing continues to step S440.

In step S440 a probability that the device will have access to the charging point prior to discharging a power storage element of the device is determined based on the device metadata. For example, a probability that the computing device will be at the power source before depleting the power storage element can be determined based on the current power storage element status (e.g., percent charged), a power storage element discharge rate while the computing device is in a normal power state and a predicted time (in the future) that the computing device will likely have access to the power source. The predicted time that the computing device will likely have access to the power source can be based on predicted user (e.g., of the computing device) actions. The predicted user actions can be based on historical data about the user, an expected geo-location of the user, information about a geo-location, aggregate data associated with like users, aggregate data associated with the geo-location and the like.

In step S430 a power save configuration is generated based on the determined probability and a threshold value. For example, the power save configuration can be generated based on the probability that a power loss (e.g., power storage element at zero charge or below a level of charge) of the device will occur and/or is a risk. In an example implementation, the probability that a power loss of the device will occur being above the threshold value, below threshold value or between the threshold values can cause a particular power save configuration to be generated. For example, if the probability a power loss will occur is high (e.g., above 0.8), the power save configuration can be based on (or be selected as) a suspend state or hibernation state (e.g., significant power usage restrictions on the device). If the probability a power loss will occur is low (e.g., below 0.2), the power save configuration can be based on (or be selected as) a full active state (e.g., no power usage restrictions on the device). If the probability a power loss will occur is in-between low (e.g., less than 0.8 and above 0.2), the power save configuration can be based on (or be selected as) a standby state (e.g., some power usage restrictions on the device).

The above flowcharts include steps that may utilize machine learning in order to predict a variable, a state, a threshold or the like. In an example implementation the prediction may use a machine learning algorithm and a trained model to provide educated predictions of what the prediction refers to. The models often include probability priors, which represent the probability of the resulting variable, state or threshold. For example, the trained model may indicate that the probability of a user charging in his car is 70% of the time, at a restaurant is 15% of the time and in his office is 95% of the time. These probability priors may be dependent on context, and the model may have different probability priors depending on what other locations or activities are found close to the location or activity mention. This is often referred to a coreference. Other machine learning algorithms could also be utilized.

Figure 5:
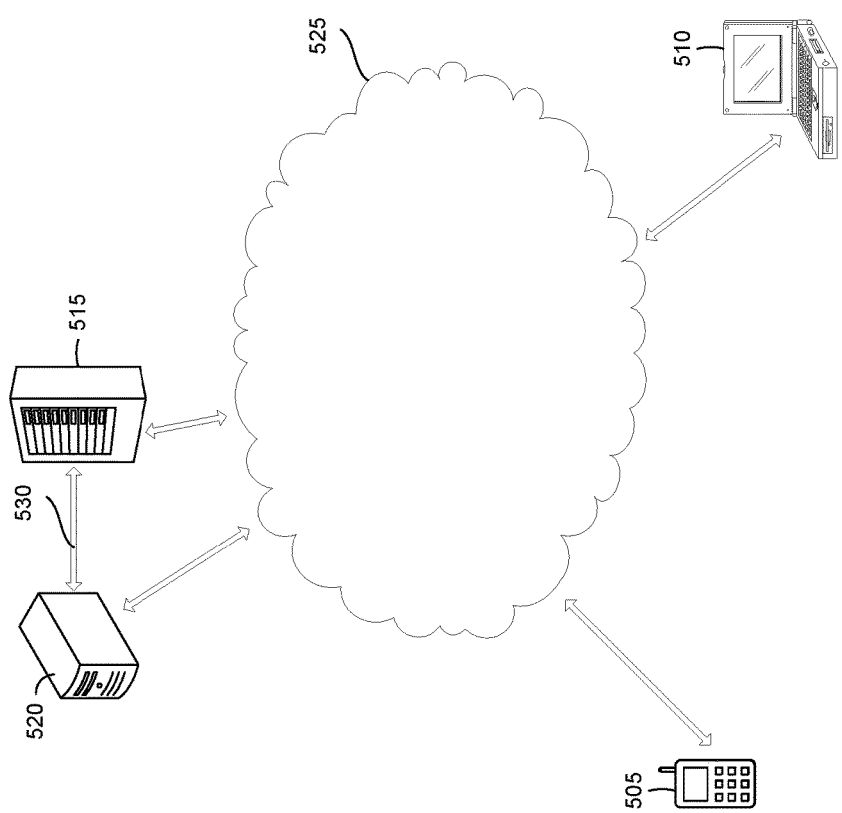
FIG. 5 is a block diagram illustrating a system in accordance with at least one example embodiment.

FIG. 5 is a block diagram illustrating a system in accordance with at least one example embodiment. As shown in FIG. 5, the system 500 includes a computing device 505 (e.g., a mobile device), a laptop 510, a server 515 and a datastore 520. The computing device 505, the laptop 510, the server 515 and the datastore 520 are illustrated as communicatively coupled via a network 525 (illustrated as a cloud network, but not limited thereto). The server 515 and the datastore 520 are also illustrated as communicatively coupled via link 530 (e.g., via a wireless and/or wired Intranet).

The computing device 505 and/or the laptop 510 can be configured to implement the power management techniques described with regards to FIGS. 1 and 2. For example, one or more power management settings of the computing device 505 and/or the laptop 510 can be altered or modified based on the current power storage element capacity and an anticipated future charging prediction.

The server 515 can be configured to implement the power management techniques described with regards to FIGS. 3 and 4. The server 515 can be configured to receive metadata from the computing device 505, the laptop 510 and/or the datastore 520. The server 515 can be configured to generate a power save configuration(s) based on the metadata and communicate the power save configuration(s) to the computing device 505 and/or the laptop 510.

The datastore 520 can be configured to store user history and/or habitual data. For example, the datastore 520 can store data associated with power use during events and/or over a duration (or portion thereof) of an event. The event can be for example, a meeting, travel, time at a location, and the like. The datastore 520 can store data associated with historical and/or habitual data about the user's use of a device, the user's activities, the user's past schedule, and the like. The user history can indicate whether or not the user of the device has previously charged the device at the location (e.g., the event location, the location and/or the like). The datastore 520 can store (or generate) aggregate data about a plurality of users that are similar to the user of the device. The datastore 520 can store data associated with the location (e.g., whether or not charging kiosks are available).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the network 525 can be a public communications network (e.g., the Internet, cellular data network, dialup modems over a telephone network) or a private communications network (e.g., private LAN, leased lines). In some implementations, the computing device 505, the laptop 510, the server 515 and the datastore 520 can communicate with the network 525 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

Depending on a current operating state (operating mode) of the computing device 505 and/or the laptop 510, the computing device 505 and/or the laptop 510 may communicate with the server 515 and/or the datastore 520 using the network 525, requesting particular data and information relevant to the current operating state of the computing device 505 and/or the laptop 510. The server 515 can provide data and information to the computing device 505 and/or the laptop 510 for use by the computing device 505 and/or the laptop 510. In some cases, the computing device 505 and/or the laptop 510 may use the data and information when entering a power save state. In some implementations, the computing device 505 and the laptop 510 may operate together to generate and/or acquire information. For example, the laptop 510 may not be capable of generating accurate geolocation information. However, the computing device 505 may be capable of generating accurate geolocation information. Therefore, if the laptop 510 is active and the computing device 505 is proximate to the laptop 510 (e.g., the user has both on her person), chances are good that the laptop 510 is geolocated at the same location as the computing device 505.

Figure 6:
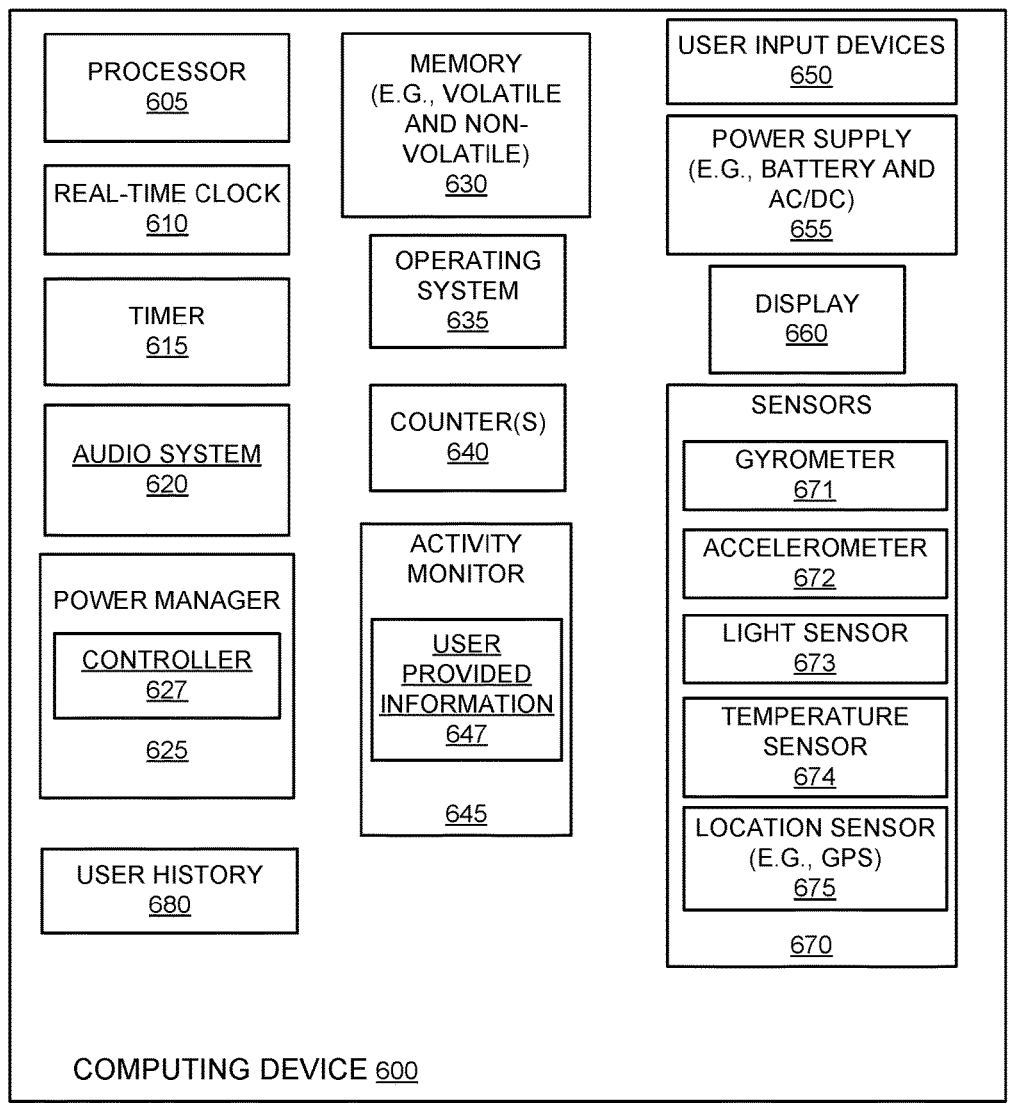
FIG. 6 is a block diagram illustrating a computing device in accordance with at least one example embodiment.

FIG. 6 is a block diagram of a computing device 600 (e.g., computing device 505 or laptop 510) in accordance with an example embodiment. Depending on the particular embodiment, the computing device 600 may take the form of a desktop computer, a laptop computer, a tablet computer, a netbook computer, or other such device. As illustrated in FIG. 6, the computing device 600 includes a number of modules, components and/or devices. It will be appreciated that the specific elements illustrated in FIG. 6 are shown for illustrative purposes and by way of example. In other embodiments, a computing device may include fewer elements, additional elements or may substitute certain elements with other elements. Also, the various elements of the computing device 600 may be operationally coupled with one another in a number of appropriate manners. For instance, a processor 605 of the computing device 600 may be operationally coupled with one or more of the other elements of the computing device 600 using a bus, or multiple busses.

As shown in FIG. 6, the computing device 600 includes the processor 605, a real-time clock (RTC) 610, a timer 615, an audio system 620, a power manager 625, memory 630, an operating system 635, counter(s) 640, an activity monitor module 645, user input devices 650, a power supply 655, a display device 660 and sensors 670. In some embodiments, two or more of these elements may be combined into a single element. For example, the power manager 625, or portions of the power manager 625, may be implemented as part of the operating system 635. In other embodiments, the power manager 625 may be implemented in firmware of the computing device 600. In certain embodiments, the functions of the power manager 625, such as describe herein, may be implemented in other fashions by one or more elements of the computing device 600.

In other embodiments, a single element of the computing device 600 may be implemented as multiple elements, or may include multiple sub-elements. For instance, the memory 630 (e.g., a non-transitory computer readable medium) may be implemented as separate volatile (e.g., random-access memory) and non-volatile memory (e.g., a hard disk drive and/or a flash memory drive) elements. In other embodiments, volatile and non-volatile memory may be implemented as sub-elements of the memory 630. As another example, the user input devices 650 may include multiple input devices, such a keyboard and a pointing device. It will be appreciated that the particular arrangement of elements of a computing device, such as the computing device 600, will depend, at least in part, on the specific embodiment.

The computing device 600 may be configured to operate and/or implement a number of different power states. Such power states may include one or more active power states, a suspend-to-RAM power state (e.g., a suspended power state), a suspend-to-disk power state (e.g., a hibernation power state) and/or a powered-off power state.

The active power states in the computing device 600 may include a display-on active state and a display-off active state. In the display-on active state, the display device 660 of the computing device 600 is active (powered on) and may be used to render visual content generated by the computing device 600. Such visual content may include user application interfaces, video content being played by the computing device 600, among a number of other types of visual content.

In the display-off active state, the display device 660 is powered off. In the display-off active state, the components of the computing device 600, other than the display device 660, may operate with substantially equivalent levels of functionality as in the display-on active state. Because computing device displays, such as the device display 660, may consume a substantial amount of power when active, operating the computing device 600 in the display-off power state (e.g., while waiting for a user to interact with the computing device 600) may consume significantly less power than operating in the display-on active state.

The suspend-to-RAM power state of the computing device 600 may be referred to as Standby, Sleep, or Suspend, depending on the particular embodiment. In such a power state, aside from powering the random access memory (RAM) to retain information regarding the computing device's 600 operating state, the computing device 600 attempts to reduce or cut power to all unneeded parts of the machine (e.g., the hard disk(s) stop spinning, the display device is placed into a dark or low power state, and peripheral devices are de-powered). For purposes of this disclosure, the suspend-to-RAM power state is referred to as a suspended power state. In such a state, the processing functions of the computing device 600 are powered down, and some small amount of power is used to preserve the contents of RAM and to support waking up the computing device from the suspended power state into an active power state. When the computing device 600 is placed into the suspended power state, it may typically consumes less than about 20% of the total power than is consumed when the computing device 600 is operating in an active power state. In the computing device 600, the sensors 670 may also remain active in the suspended power state, where the computing device 600 may decide, based on events detected by the sensors 670, to change a power state of the computing device 600 in accordance with the techniques described herein.

The suspend-to-disk power state of the computing device 600 may be referred to as Hibernate, or Safe Sleep or suspend-to-disk, depending on the particular embodiment. In such a power state, the contents of the computing device's 600 RAM may be written to non-volatile storage such as a hard disk, as a file, or on a separate partition, before placing the computing device 600 in such a low power state. When the computing device 600 is restarted or resumed, it reloads the data that was previously written to the non-volatile memory and is, thus, restored to the state it was in when the low power state was invoked. To enable use of such a power state, the hard disk (or other non-volatile memory) must have sufficient free space to store all non-replaceable contents of RAM. For purposes of this disclosure, the suspend-to-disk power state is referred to as a hibernation power state. When the computing device 600 is placed into the hibernation power state, it may consume about as much power as is consumed when the computing device 600 is powered off. In like fashion as discussed above with respect to the suspended power state, the sensors 670 of the computing device 600 may remain active in the hibernation power state, where the computing device 600 may decide, based on events detected by the sensors 670, to change a power state of the computing device 600.

Other reduced power states of the computing device 600 are within the scope of this disclosure. The other reduced power states may be include a reduced CPU usage, a dimmed display, a decreased frame-refresh rate, disabling Bluetooth and/or the like and/or any combinations thereof.

In the computing device 600, the power manager 625 may be configured to manage the process of transitioning the computing device 600 from one power state to another. For example, the power manager 625 may include a controller 627, such as an embedded controller, that is configured to signal one or more elements of the computing device 600 to initiate or cause a desired change in power state (e.g., based on signals and/or data from other elements of the computing device 600, such as the sensors 670). The power manager 625 may be further configured to monitor the various elements of the computing device 600 to ensure that they complete any operations or functions associated with a transition between power states of the computing device 600. For example, if the computing device 600 is transitioning from an active power state to a suspended power state, a hibernation power state, or an off state, the power manager 625 may monitor the various elements of the computing device 600 to ensure that any housekeeping operations (e.g., saving operating state information for use when returning the computing device 600 to an active power state) are completed before allowing the computing device 600 to enter the suspended power state, the hibernation power state or the off state.

As indicated above, in the computing device 600, the sensors 670 may be configured to detect the occurrence of certain events, such as changes in physical orientation of the computing device 600 and/or changes in an ambient environment of the computing device 600. As described herein, in response to detecting such events, the sensors 670 may be configured to provide information to the controller 627 (or the processor 605) about one or more detected events. In the computing device 600, the power manager 625 (e.g., using the controller 627) may be configured, based on the information provided by the sensors 670, to select a power state for the computing device 600 and initiate a transition of the computing device 600 to the selected power state, such as in the manners described herein.

The power manager 625 may be configured to receive modifications (e.g., temporary modifications) to one or more of the aforementioned power states from a computing device (e.g., server 515) configured to alter or modify one or more power management settings based on the current power storage element capacity and an anticipated future charging prediction. In addition (and/or alternatively), the power management settings can be altered based on a determined confidence interval (e.g., a time interval between entry into a power save state and a next charge opportunity), risk of power loss and currently available power storage element charge. The power management settings can be altered or modified to improve (as opposed to automatically entering a power save state) user experience.

The power manager 625 may be configured to store a current power management setting (e.g., variables associated with a power state) and replace the power management setting with the received modifications. The stored power management setting can be restored at a future time (e.g., when the temporary modifications expire). The power manager 625 may be configured to communicate metadata associated with the computing device 600 and/or a user of the computing device 600 to another computing device (e.g., server 515) configured to alter or modify one or more power management settings.

As shown in FIG. 6, the sensors 670 of the computing device 600 may include a gyrometer 671, an accelerometer 672, a light sensor 673, a temperature sensor 674 and a location sensor 675, such as a global positioning system (GPS) sensor. In other implementations, other sensors and/or types of sensors may be used. For instance, in one implementation, the location sensor 675 may operate based on Wi-Fi or cellular communication signals (e.g., using triangulation or other approaches). Such approaches for determining location may be used in addition to, or in place of a GPS sensor. In still other implementations, other types of sensors may be included in the sensors 670, while in yet other implementations, one or more of the sensors 670 shown in FIG. 6 may be eliminated.

As described herein, the sensors 670 may be configured to detect the occurrence of various events and provide information regarding such events to the power manager 625. For example, the gyrometer 671 may be configured to detect changes in physical orientation of the computing device 600, e.g., between a vertical orientation and a horizontal orientation. The accelerometer 672 may be configured to detect changes in vibrations, or patterns of vibrations occurring in an ambient environment of the computing device 600, such as may be caused by footsteps of a person or persons walking in the vicinity of the computing device 600 or movement of the computing device 600. The light sensor 673 may be configured to detect changes in light intensity in the ambient environment of the computing device 600, such as may result from lights being turned on or off, or by removing the computing device 600 from, or placing the computing device 600 in a carrying case. In an example embodiment, the light sensor 673 may be configured to detect a rate of change in light intensity and only provide information to the controller 627 (power manager 625) regarding changes in light intensity above a threshold rate of change. The temperature sensor 674 may be configured to detect changes in temperature in the ambient environment of the computing device 600, such as may be caused by a climate control system being turned on or off, or as a result of removing the computing device 600 from a carrying case, as some examples. In an example embodiment, the temperature sensor 674 may be configured to detect a rate of change in temperature and only provide information to the controller 627 (power manager 625) regarding changes in temperature above a threshold rate of change. The location sensor 675 may be configured to detect changes in a physical location of the computing device 600, such as may occur if a user is traveling with the computing device 600.

Depending on the particular situation, information about detected events may be provided from each of the sensors to the power manager 625 while the computing device 600 is in a low power, when the computing device 600 is in an active power state, and/or when the computing device 600 is transitioning between power states. For example, in one approach, the gyrometer 671, the accelerometer 672, the light sensor 673 and the temperature sensor 674 may provide information to the power manager 625 regardless of the power state of the computing device 600, while the location sensor 675 may only provide location information to the power manager when the computing device 600 is transitioning between power states. In other approaches, a location of the computing device 600 may be determined by the location sensor 675 in response to the controller 627 being activated (e.g., by an event detected by one of the other sensors 670). Information regarding events detected by the sensors 670 that is provided to the power manager 625 may be used by the power manager 625 to generate a heuristic-based usage pattern for the computing device 600. That usage pattern may then be used to improve power management for the computing device 600, as well as to enhance a user's experience when using the computing device 600, such as by using the techniques described herein.

Based on information provided by the sensors 670 regarding such events, the power manager 625 may select a power state for the computing device 600 and then initiate, or cause the computing device 600 to transition to the selected power state. Such approaches may improve a user's experience when using the computing device 600, as the computing device 600 may change power states (e.g., a hibernation power state to a suspended or active power state) in response to events detected by the sensors 670. Using such approaches may reduce, or eliminate the amount of time a user has to wait before being able to begin using the computing device 600, as compared to approaches where a user first interacts with computer (e.g., using an input device) to initiate such power state transitions. Depending on the particular embodiment, information regarding events detected by the sensors 670 may be used alone, or in combination with each other to select a power state for the computing device 600.

In certain embodiments, the power manager 625 of the computing device 600 may also use information received from the sensors 670 in combination with other information when selecting power states for the computing device 600. For instance, information from the sensors 670 may be used in combination, for example, with usage pattern information that is included in the activity monitor 645. In such an approach, the activity monitor 645 may be configured to monitor usage patterns of the computing device 600 (e.g., times when the computing device 600 is typically used) and keep track of such patterns. In other approaches, the power manager may also use an amount of remaining power storage element capacity when selecting a power state. For instance, the power manager 625 may only select an active power state if the remaining batter capacity is above a threshold value.

As shown in FIG. 6, the activity monitor 645 may also include user provided information 647. In an example approach, the user provided information 647 may include, as some examples, out-of-office notices and calendar information (e.g., scheduled events, such as meetings, vacations, or otherwise). As another example, information from the real-time clock 610 (e.g., day of week, time of day) may be used in combination with information from the sensors 670 and/or usage pattern information included in the activity monitor 645 when selecting power states for the computing device 600.

As an example of an event that may be detected by the sensors 670, the accelerometer 672 may detect vibrations (or a change in vibrations or vibration patterns) occurring in an ambient environment of the computing device 600, which may indicate footsteps in the vicinity of the computing device 600, such as those of a user approaching the computing device 600. The accelerometer 672 may then provide that information to the power manager 625. As part of selecting a power state for the computing device 600, the power manager 625 may obtain information from the activity monitor 645 and/or the RTC 610. If information included in the activity monitor 645 (e.g., usage patterns and/or the user provided information 647) and/or information from the RTC 610 (e.g., day of week and time of day) indicates that it is likely a user may want to use the computing device 600, the power manager 625 may initiate a transition of the computing device from a hibernation power state (or a suspended power state) to an active power state. However, if information included in the activity monitor 645 and/or information from the RTC 610 indicates that it is unlikely a user wants to use the computing device 600 (e.g., the user has entered an out-of-office notice), the power manager 625 may select the hibernation power state or the suspended power state in response to the information from the accelerometer 672.

In certain embodiments, the power manager 625 may be configured to operate in conjunction with the timer 615 (as well as using other information) when selecting power states for the computing device 610. As an example, the sensors 670 may detect one or more events and provide information regarding those events to the power manager 625. For instance, the light sensor 673 may detect a sudden change in light intensity in an ambient environment of the computing device 600 (e.g., such as office lights being turned on) and provide information to the power manager 625 regarding the change. The power manager 625 may then determine, based on usage patterns included in the activity monitor 645 and day and time information from the RTC 610, that a user typically uses the computing device 600 thirty minutes after such an event occurring at a particular day and time. As a result of this determination, the power manager 625 may set the timer 615 to initiate a transition of the computing device 100 to an active power state twenty-five minutes after detection of the detected change in light intensity. Such an approach allows the user to begin using the computer after the transition is complete, without having to first interact with the computer to initiate the power state transition. In other instances, other events detected by the sensors 670 may be handled in a similar fashion.

In certain embodiments the counter(s) 640 may be used to keep track of false positive power state selections. A false positive may refer to instances where the power manager 625, in response to events detected by the sensors 670, selects either the suspended power state or the active power state in anticipation of a user interacting with the computing device 610 and such user interaction does not occur within a specific period of time. In such false positive situations, the power manager 625 (e.g., using controller 627) may increment a count value of a respective counter in the counter(s) 640. If the number of consecutive false positives (e.g., the count value) exceeds a threshold amount, the power manager may be configured to disable the sensors 670 and transition the computing device to the hibernation power state. In such a situation, a user may need to interact with the computing device 600 (e.g., by using a user input device or pressing a power button) in order to transition the computing device 600 to an active power state.

Depending on the particular embodiment, the counter(s) 640 may comprise a single counter that tracks each occurrence of a false positive, or may include multiple counters that track, respectively, false positives associated with a specific event (or groups of events) detected by the sensors 670. In such approaches, the false positive count, or counts, may be cleared when user interaction does occur within the specific (e.g., predetermined) period of time. In the computing device 600, information regarding false positives may be collected by the activity monitor 645 and used to reduce the number of false positives that occur, such as by modifying usage pattern information included in the activity monitor 645.

Figure 7:
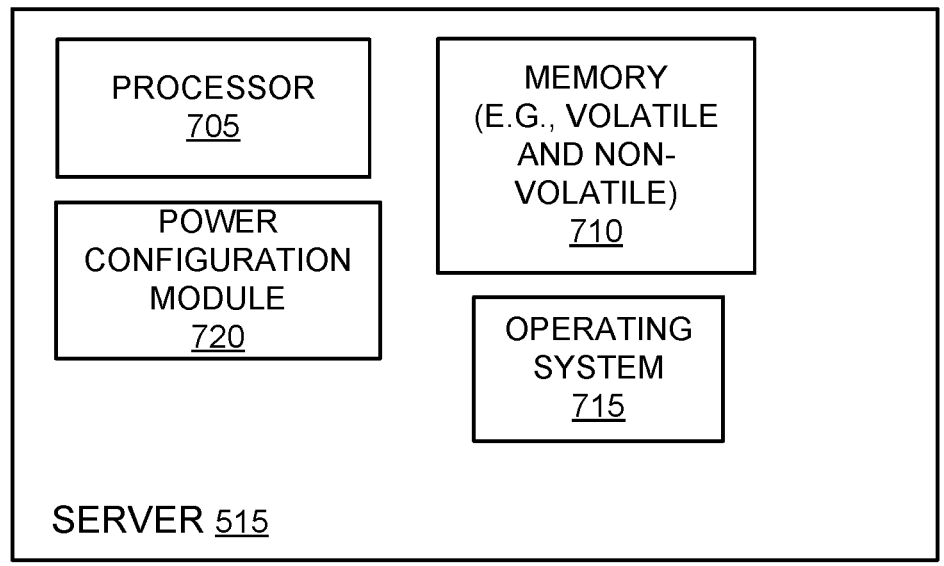
FIG. 7 is a block diagram illustrating a server in accordance with at least one example embodiment.

FIG. 7 is a block diagram illustrating a server in accordance with at least one example embodiment. As illustrated in FIG. 7, the server 515 includes a number of modules, components and/or devices. It will be appreciated that the specific elements illustrated in FIG. 7 are shown for illustrative purposes and by way of example. In other embodiments, the server 515 may include fewer elements, additional elements or may substitute certain elements with other elements. Also, the various elements of the server 515 may be operationally coupled with one another in a number of appropriate manners. For instance, a processor 705 of the server 515 may be operationally coupled with one or more of the other elements of the server 515 using a bus, or multiple busses. The memory 630 may be implemented as separate volatile (e.g., random-access memory) and non-volatile memory (e.g., a hard disk drive and/or a flash memory drive) elements. In other embodiments, volatile and non-volatile memory may be implemented as sub-elements of the memory 630.

The power configuration module 720, or portions of the power configuration module 720, may be implemented as part of the operating system 715. In other embodiments, the power configuration module 720 may be implemented in firmware of the server 515. In certain embodiments, the functions of the power configuration module 720, such as describe herein, may be implemented in other fashions by one or more elements of the server 515.

The power configuration module 720 may be configured to implement the methods described above with regard to FIGS. 3 and 4. The power configuration module 720 may be configured to alter or modify one or more power management settings as described above. For example, one or more power management settings can be altered or modified based on a current power storage element capacity of a computing device (e.g., computing device 505 and/or laptop 510) and an anticipated future charging prediction. In addition (and/or alternatively), the power management settings can be altered based on a determined confidence interval (e.g., a time interval between entry into a power save state and a next charge opportunity), risk of power loss and currently available power storage element charge.

Figure 8:
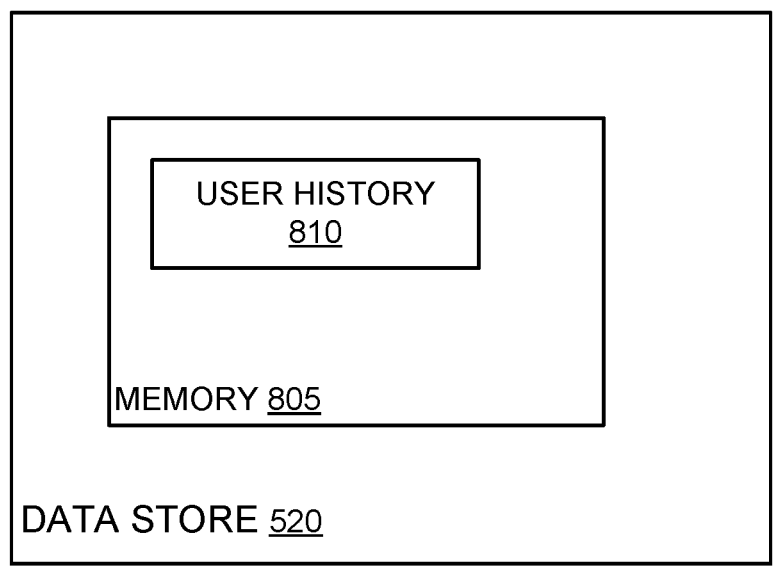
FIG. 8 is a block diagram illustrating a data store in accordance with at least one example embodiment.

FIG. 8 is a block diagram illustrating a data store in accordance with at least one example embodiment. As shown in FIG. 8, the data store 520 can include a memory 805 including user history 810. As illustrated in FIG. 8, the data store 520 includes a number of modules, components and/or devices. It will be appreciated that the specific elements illustrated in FIG. 8 are shown for illustrative purposes and by way of example. In other embodiments, the data store 520 may include fewer elements, additional elements (e.g., a processor) or may substitute certain elements with other elements. Also, the various elements of the data store 520 may be operationally coupled with one another in a number of appropriate manners. The memory 805 and user history may be implemented as a data structure including a database.

The user history 810 can store data associated with power use during events and/or over a duration (or portion thereof) of an event. The event can be for example, a meeting, travel, time at a location, and the like. The user history 810 can include data associated with historical and/or habitual data about the user's use of a device, the user's activities, the user's past schedule, and the like. The user history 810 can include (or be used to generate) aggregate data about a plurality of users that are similar to the user of the device. The user history 810 can be used to determine information associated with the location (e.g., whether or not charging kiosks are available).

Figure 9:
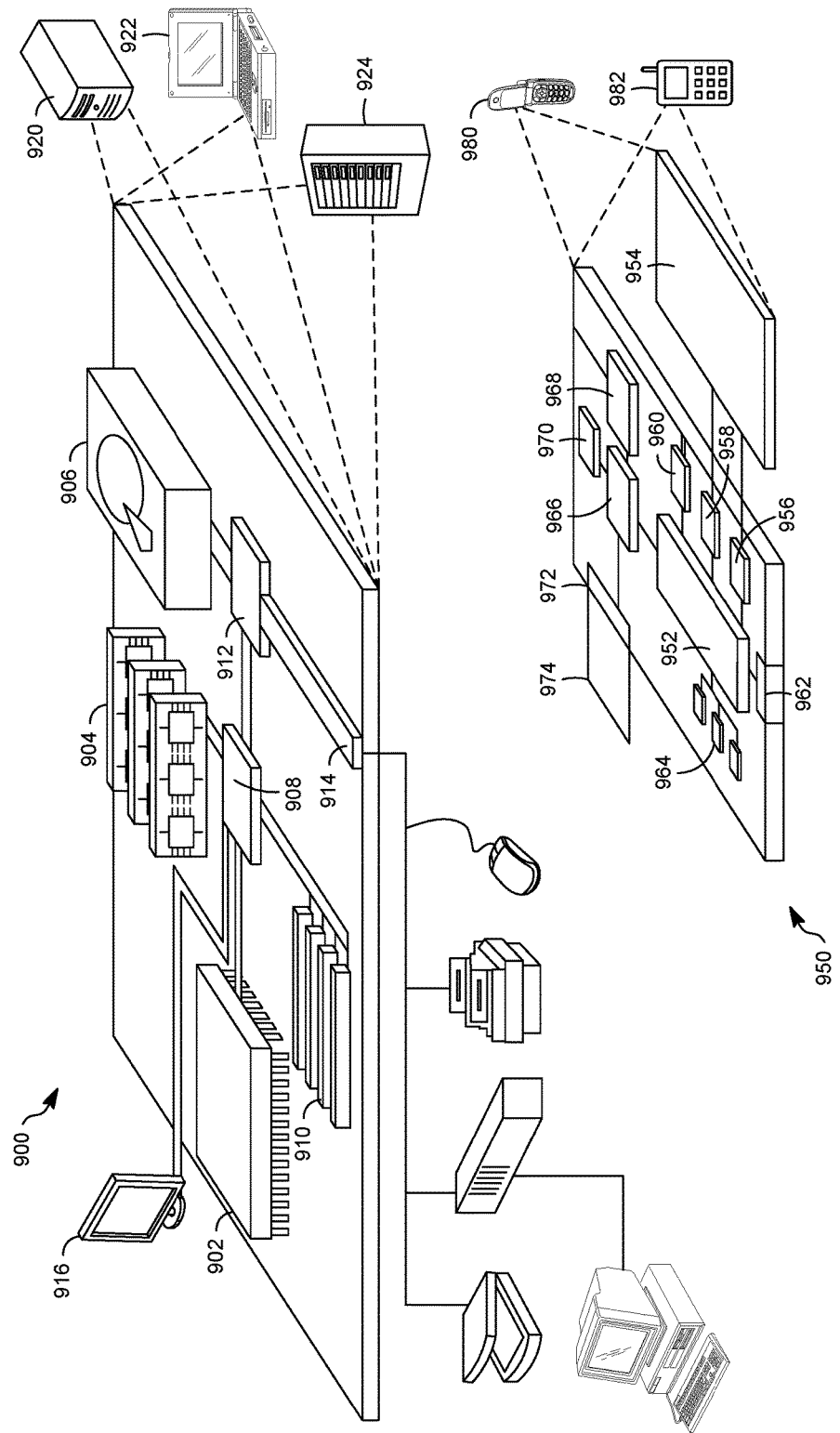
FIG. 9 shows an example of a computer device and a mobile computer device according to at least one example embodiment.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in a non-transitory computer readable medium (e.g., the memory 904) or on the storage device 906 (e.g., configured to store data and/or processor executable instructions) to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. For example, the storage device 906 can store data and/or processor (e.g., processor 902) executable instructions) In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data (e.g., using GPS satellites, Wi-Fi or cell-tower multi-lateration) to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   receiving an instruction to transition a computing device into a reduced power state;
   in response to receiving the instruction to transition,
      predicting a future availability of a power source to provide power to the computing device;
      determining a charge of a power storage element of the computing device;
      determining whether the predicted future availability of the power source is predicted to be available before the charge of the power storage element falls below a threshold value;
      determining a probability that a power loss causes the charge of the power storage element to fall below the threshold value;
   in response to determining the probability of the power loss will not cause the charge of the power storage element to fall below the threshold value and determining that the predicted future availability of the power source is predicted to be available before the charge of the power storage element falls below the threshold value, preventing the transition of the computing device into the reduced power state; and
   in response to determining the probability of the power loss causes the charge of the power storage element to fall below the threshold value or determining that the predicted future availability of the power source is not predicted to be available before the charge of the power storage element falls below the threshold value, transitioning the computing device into the reduced power state.

2. The method of claim 1, wherein the determining of whether the predicted future availability of the power source is predicted to be available before the charge of the power storage element falls below the threshold value is based on a current power storage element status, a power storage element discharge rate while the computing device is in a normal power state and a predicted time that the computing device will have access to the power source.

3. The method of claim 1, wherein the availability of the power source is predicted based on at least one of:
   a calendar event associated with a user of the computing device and location data associated with the calendar event,
   a behavior of the user and location data associated with the behavior, and
   a charging history associated with the location data.

4. The method of claim 1, wherein the determining of whether the predicted future availability of the power source is predicted to be available before the charge of the power storage element falls below the threshold value includes:

determining, based on variables used to determine a next charge opportunity and an amount of power that will be consumed by the computing device, a risk factor, the risk factor indicating how likely the next charge opportunity is to be reached before a determined amount of power will be consumed by the computing device, determining a confidence interval indicating how likely the next charge opportunity and the amount of power that will be consumed by the computing device are accurate, and using the confidence interval and the risk factor to help determine the predicted future availability of the power source.

5. The method of claim 1, further comprising:

communicating a current power storage element status, a power storage element discharge rate, and at least one scheduled event associated with a user of the computing device to a server communicatively coupled to the computing device;

receiving a power save configuration in response to communicating the current power storage element status, the power storage element discharge rate, and the at least one scheduled event to the server, the power save configuration being based on the predicted future availability of the power source and the determined charge of the power storage element;

using the power save configuration to modify the reduced power state; and using the modified reduced power state to prevent the transition of the computing device into the reduced power state.

6. The method of claim 1, wherein transitioning the computing device into the reduced power state includes communicating at least one signal to one or more elements of the computing device.

7. A method comprising:

receiving, at a remote device, a current power storage element status, a power storage element discharge rate and at least one scheduled event associated with a user of a computing device;

predicting, by the remote device, a future availability of a power source to provide power to the computing device, the availability of the power source being determined based on the at least one scheduled event associated with the user;

determining, by the remote device, a charge of a power storage element of the computing device, the charge of the power storage element being determined based on the current power storage element status and based on the power storage element discharge rate;

determining, by the remote device, whether the future power source is predicted to be available before the determined charge of the power storage element falls below a threshold value;

upon determining that the future power source is predicted to be available before the determined charge of the power storage element falls below the threshold value, generating a modified reduced power state based on a full active state, wherein the full active state indicates the computing device is operating without any power restrictive settings;

receiving, by the remote device, an indication that the computing device is to transition into a reduced power state; and in response to receiving the indication that the computing device is to transition into the reduced power state, communicating the modified reduced power state, from the remote device, to the computing device.

8. The method of claim 7, wherein the determining of whether the future power source is predicted to be available before the determined charge of the power storage element falls below the threshold value includes:

determining, based on variables used to determine a next charge opportunity and an amount of power that will be consumed by the computing device, a risk factor, the risk factor indicating how likely the next charge opportunity is to be reached before a determined amount of power will be consumed by the computing device, determining a confidence interval indicating how likely the next charge opportunity and the amount of power that will be consumed by the computing device are accurate, and using the confidence interval and the risk factor to determine the predicted future availability of the power source.

9. The method of claim 7, wherein the determined availability of the power source is determined based on at least one of:

a calendar event and location data associated with the calendar event, a user behavior and location data associated with the user behavior, and a charging history associated with the location data.

10. The method of claim 7, further comprises:

receiving a user history associated with the user of the computing device, the user history indicating power use associated with at least one of:

during an event, and over a duration of the event, wherein the prediction of the future availability of the power source is further based on the user history.

11. The method of claim 7, further comprises:

receiving an aggregate user history associated with the user of the computing device, wherein the aggregate user history includes historical data associated with a plurality of users having a historical power use at least one of during an event and over a duration of the event similar to the at least one scheduled event, and the prediction of the future availability of the power source is further based on the aggregate user history.

12. The method of claim 7, the method further comprises:

receiving a user history associated with a location, wherein the user history indicates whether or not the user of the device has previously charged the device at the location, the availability of the power source is predicted based on a calendar event and location data associated with the calendar event, the location data indicating the computing device will be at the location.

13. The method of claim 7, wherein determining a probability that the computing device will have access to the power source before the charge of the power storage element falls below the threshold value is determined based on the current power storage element status, the power storage element discharge rate and the at least one scheduled event associated with a user of the computing device, and the modified reduced power state is generated based on the determined probability and the threshold value.

14. A non-transitory computer readable medium having code segments stored thereon, the code segments, when executed by a processor cause the processor to:
receive, at a remote device, a current power storage element status, a power storage element discharge rate and at least one scheduled event associated with a user of a computing device;
predict, by the remote device, a future availability of a power source to provide power to the computing device;
determine, by the remote device, a charge of a power storage element of the computing device,
the future availability of the power source being determined based on the at least one scheduled event associated with the user, and
the charge of the power storage element being determined based on the current power storage element status and based on the power storage element discharge rate;
determine, by the remote device, whether the power source is predicted to be available before the charge of the power storage element falls below a threshold value;
upon determining that the power source is predicted to be available before the charge of the power storage element falls below the threshold value, generate a modified reduced power state based on a full active state, wherein the full active state indicates the computing device is operating without any power restrictive settings; and
receiving, by the remote device, an indication that the computing device is to transition into a reduced power state; and
in response to receiving the indication that the computing device is to transition into the reduced power state, communicate the modified reduced power state, from the remote device, to the computing device.

15. The non-transitory computer readable medium of claim 14, wherein the determining of whether the future availability of the power source is predicted to be available before the determined charge of the power storage element falls below the threshold value includes:
determining, based on variables used to determine a next charge opportunity and an amount of power that will be consumed by the computing device, a risk factor, the risk factor indicating how likely the next charge opportunity is to be reached before a determined amount of power will be consumed by the computing device,
determining a confidence interval indicating how likely the next charge opportunity and the amount of power that will be consumed by the computing device are accurate, and
use the confidence interval and the risk factor to predict the future availability of the power source.

16. The non-transitory computer readable medium of claim 14, wherein the availability of the power source is determined based on at least one of:
a calendar event and location data associated with the calendar event,
a user behavior and location data associated with the user behavior, and
a charging history associated with the location data.

17. The non-transitory computer readable medium of claim 14, wherein the code segments, when executed by the processor further cause the processor to:
receive a user history associated with the user of the computing device, the user history indicating power use associated with at least one of:
during an event, and
over a duration of the event, wherein the prediction of the future availability of the power source is further based on the user history.

18. The non-transitory computer readable medium of claim 14, wherein the code segments, when executed by the processor further cause the processor to:
receive an aggregate user history associated with the user of the computing device, wherein
the aggregate user history includes historical data associated with a plurality of users having a historical power use at least one of during an event and over a duration of the event similar to the at least one scheduled event, and
the prediction of the future availability of the power source is further based on the aggregate user history.

19. The non-transitory computer readable medium of claim 14, wherein the code segments, when executed by the processor further cause the processor to:
receive a user history associated with a location, wherein
the user history indicates whether or not the user of the device has previously charged the device at the location,
the availability of the power source is predicted based on a calendar event and location data associated with the calendar event, the location data indicating the computing device will be at the location.

20. The non-transitory computer readable medium of claim 14, wherein
determining of a probability that the computing device will have access to the power source before the charge of the power storage element falls below the threshold value is determined based on the current power storage element status, the power storage element discharge rate and the at least one scheduled event associated with a user of the computing device, and
the modified reduced power state is generated based on the determined probability and the threshold value.

* * * * *